United States Patent [19]
Sugiura et al.

[11] 3,880,380
[45] Apr. 29, 1975

[54] SEAT BELT WEBBING RETRACTOR

[75] Inventors: Fumio Sugiura, Aichi-ken; Kazuo Okamoto, Toyota, both of Japan

[73] Assignee: Toyota Jidosha Kogyo Kabushiki Kaisha, Toyota-shi, Aichi-ken, Japan

[22] Filed: Aug. 27, 1973

[21] Appl. No.: 391,795

[30] Foreign Application Priority Data
Mar. 12, 1973  Japan.............................. 48-28781

[52] U.S. Cl........................... 242/107.4; 242/107.6
[51] Int. Cl. ..................... A62b 35/00; B65h 75/48
[58] Field of Search......... 242/107 SB, 107.4, 107.6

[56] References Cited
UNITED STATES PATENTS

| | | | |
|---|---|---|---|
| 3,667,698 | 6/1972 | Fisher | 242/107.4 |
| 3,679,228 | 7/1972 | Settimi | 242/107.4 |
| 3,740,000 | 6/1972 | Takada | 242/107.4 |
| 3,767,134 | 10/1973 | Morales | 242/107 SB |

*Primary Examiner*—Billy S. Taylor
*Attorney, Agent, or Firm*—Stevens, Davis, Miller & Mosher

[57] ABSTRACT

An off-lock type electric seat belt webbing retractor for vehicles using a cam plate, which is coupled through gears to a seat belt webbing take-up shaft such that it can execute substantially one rotation for a total number of rotations of the take-up shaft required for paying off the total length of the seat belt webbing and which includes a cam section adapted to engage with a spring biased pawl so as to hold the pawl at a position not subject to engagement with ratchets integral with the take-up shaft only during an initial period of paying off the seat belt webbing and another cam section adapted to act upon a switch means for rendering a solenoid unit adapted to attract the pawl against the bias spring force de-energized only during the afore-said initial period. With this construction, the seat belt webbing can be released for its withdrawal up to a predetermined length by mechanical means and can also be released for further withdrawal by electric means rendered operative by the action of a detecting switch detecting the predetermined length of the withdrawn seat belt webbing. Thus, satisfactory operability and reliability can be ensured, and particularly high reliability can be obtained at the time of an automotive accident or the like.

14 Claims, 10 Drawing Figures

FIG. 6
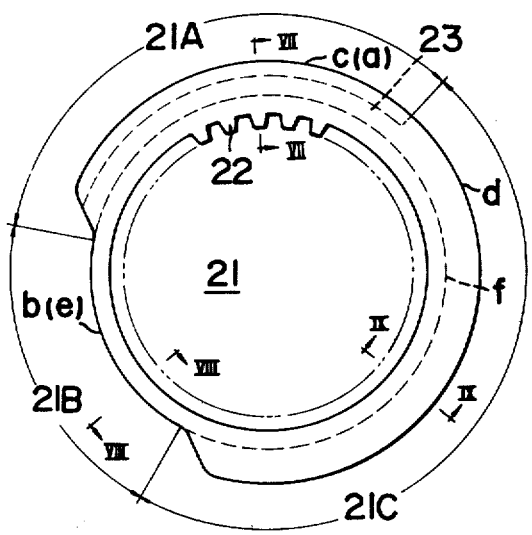
FIG. 7     FIG. 8     FIG. 9
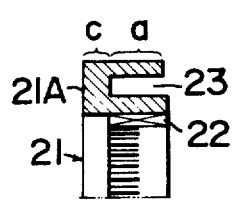 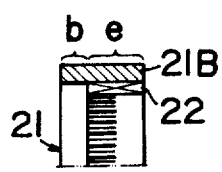 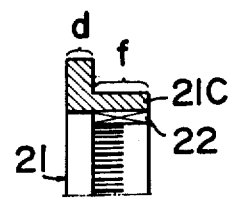

SEAT BELT WEBBING RETRACTOR

This invention relates to electric seat belt webbing retractors for seat belt devices installed in seats of vehicles such as automobiles.

The electric seat belt webbing retractors of this type are roughly classed into the so-called on-lock type, wherein the seat belt webbing is completely locked against paying-off or taking-up operation thereof upon energization of a solenoid unit in response to the action of a collision sensor means, and the so-called off-lock type, wherein the seat belt webbing is locked against paying-off or taking-up operation upon de-energization of a solenoid unit in response to the actuation of collision sensor means.

The present invention has an an object to eliminate drawbacks in the off-lock type electric seat belt webbing retractors.

In the prior-art off-lock type electric seat belt webbing retractor, the seat belt webbing is not released unless the solenoid unit is energized. This gives rise to problems from the standpoints of wasteful consumption of electricity and risky operability particularly where the battery capacity is small and limited as in automobiles.

The invention features a seat belt webbing retractor comprising ratchets secured to the ends of a take-up shaft spring biased in the direction of taking up the seat belt webbing, a cam disc geared to the take-up shaft and adapted to execute substantially one rotation with the total number of rotations of the take-up shaft required to pay off the entire length of the seat belt webbing, a pawl disposed within the retractor body and always urged such as to engage with the ratchets for preventing the rotation of the take-up shaft in the direction of paying off the seat belt webbing, and a solenoid unit supported on the retractor body and adapted to hold during the energization thereof the pawl at a non-engagement position, and a cam plate including a cam section adapted to engage with the pawl so as to hold the pawl at the non-engagement position only during an initial period of paying off the seat belt webbing and another cam section adapted to act upon a switch means for rendering the solenoid unit de-energized only during the afore-said initial period, said solenoid unit being provided to be de-energized only during the afore-said initial period, said solenoid unit being provided with a de-energizing circuit actuated by a collision sensor means.

With this construction, the seat belt webbing can be released for its withdrawal up to a predetermined length by mechanical means and can also be released for further withdrawal by electric means rendered operative by the actuation of a detecting switch detecting the predetermined length of the withdrawn seat belt webbing. Thus, satisfactory operability and reliability can be ensured, and particularly high reliability can be obtained at the time of an automotive accident or the like.

Also, the detecting switch detecting the predetermined length of the withdrawn seat belt webbing requires small installation space, which is very advantageous in view of the manufacturing cost. Also, by leaving the withdrawn seat belt webbing unrestrained it can be immediately taken up to turn off the solenoid circuit, which is very useful for preventing the phenomenon of the battery drop. Thus, the problem of the battery drop can be very readily solved.

The above and further objects and novel features of the invention will more fully appear from the following detailed description when read in connection with the accompanying drawings.

It is to be expressly understood, however, that the drawing are for the purpose of illustration only and is not intended as a definition of the limits of the invention.

The drawing illustrates an off-lock type seat belt webbing retractor according to the invention, and in which:

FIG. 6 is a front view of a cam plate;

FIG. 7 is a fragmentary sectional view taken along line VII—VII in FIG. 6;

FIG. 8 is a fragmentary sectional view taken along line VIII—VIII in FIG. 6;

FIG. 9 is a fragmentary sectional view taken along line IX—IX in FIG. 6; and

Figure 1:
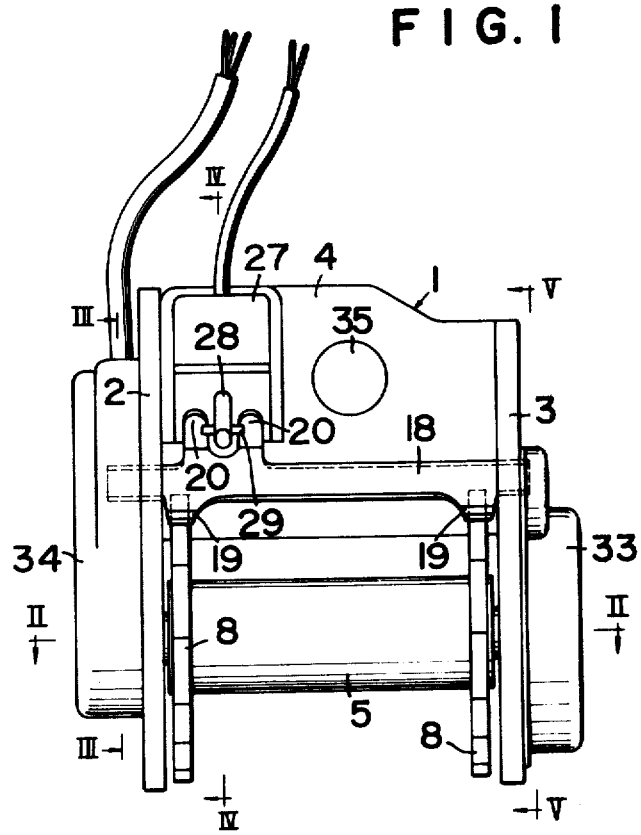
FIG. 1 is a plan view of the retractor.
Figure 2:
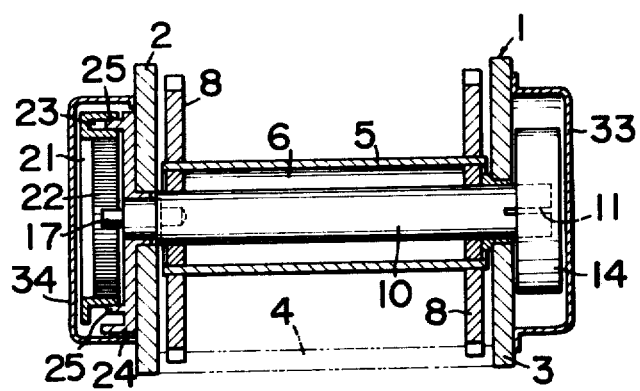
FIG. 2 is a sectional view taken along line II—II in FIG. 1.

The illustrated retractor comprises a retractor body 1 having opposite side walls 2 and 3 and a bottom 4.

A hollow shaft 5 having a cylindrical inner space 6 and a main shaft constitute a take-up shaft, on which a seat belt webbing 12 is taken up.

The hollow shaft 5 has an axial slot 7 formed over its entire length, and it is provided at its opposite ends with respective ratchets 8 secured to it and having a number of clicks 9.

The main shaft 10 extends within and is made integral with the hollow shaft 5, and both are rotatably mounted between the side walls 2 and 3 of the retractor body 1.

The seat belt webbing 12 has a loop portion 13, which is anchored round the main shaft 10 and extends in the space between hollow shaft 5 and main shaft 10.

The ends of the main shaft 10 penetrate the side walls 2 and 3 of the retractor body 1. A groove 11 is formed in one end of the main shaft. Anchored in this groove 11 is an inner end 15 of a spiral spring 14, whose outer end 16 is fixed to the side wall 3 of the retractor body 1. With this construction, the take-up shaft consisting of main shaft 10 and hollow shaft 5 is spring biased in the direction of taking up the seat belt webbing 12.

The other end of the main shaft 10 extending outwardly of the side wall 2 of the retractor body 1 is provided with a small gear 17 having an involute gear form and is integral with the main shaft.

Numeral 18 designates a pawl having engagement projections 19 for engagement with clicks 9 of the respective ratchets 8 to prevent the rotation of the take-up shaft in the direction of paying off the seat belt webbing 12. The pawl 18 is pivotably mounted between the side walls 2 and 3 of the retractor body 1 such that it can assume a position at which it can engage with the ratchets 8 and another position at which it will not engage with the ratchets. It is biased with a plate spring 26 provided on the outer side of the side wall 2 such that it normally assumes the position at which it can engage with the ratchets 8.

The pawl 18 also has two L-shaped legs 20 extending from its portion near the side wall 2 of the retractor body 1. These legs 20 are coupled by a pin 29 to a plunger 28 of a solenoid unit 27, which is secured to the side wall 2 of the retractor body 1 and can be de-energized by the action of a collision sensor at the time of an emergency such as a collision to be described later.

While the solenoid unit 27 is energized, it holds the pawl 18 withdrawn to the non-engagement position with respect to the ratchets 8 against the restoring force of the plate spring 26.

Numeral 21 designates a cam plate formed with an internal gear 22 meshing with the small gear 17 extending from the end of the main shaft other than the grooved end. Thus, the cam plate 21 can rotate in proportion to the extent of taking-up or paying-off of the seat belt webbing 12. It is designed to execute substantially one rotation when the entire length of the seat belt webbing is paid off.

The cam plate 21 can rotate with the take-up shaft owing to engagement between an arcular groove 23 formed on the inner side of its cam section 21A to be described later and an arcular guide ridge 25 extending from a guide plate 24 secured to the outer side of the side wall 2 of the retractor 1.

The cam plate 21 has its periphery divided into three cam sections 21A, 21B and 21C, as shown in FIG. 6. The individual cam sections have respective sectional profiles as shown in FIGS. 7, 8 and 9. The cam section 21B subtends a smaller angle than the cam section 21A, and the cam section 21C subtends a greater angle than the cam section 21A.

The cam section 21A has a peripheral length corresponding to an initially paid-off section of the seat belt webbing 12, and it has a raised peripheral face $a$ and $c$, as shown in FIG. 7. The cam section 21B has a peripheral length corresponding to a finally paid-off section of the seat belt webbing 12, and it has a non-raised peripheral face $e$ and $b$, as shown in FIG. 8. The cam section 21C has a peripheral length corresponding to an intermediate section of the seat belt webbing 12, this section being provided for the purpose of operability for restraining the occupant, and it has a peripheral face $f$ at the same level as the face $e$ and $b$ and another peripheral face $d$ at the same level as the face $a$ and $c$, as shown in FIG. 9.

The level of the face $a$ is set such that when the face $a$ engages with the pawl 18 it can raise the engagement projections 19 to a position not subject to engagement with the clicks 9 of the ratchets 8 as will be described later. On the other hand, the level of the faces $e$ and $f$ is set such that when these faces engage with the pawl 18, they can lower the engagement projections to a position subject to engagement with the clicks 9 of the ratchets 8.

The level of the face $c$ or $d$ is set such that when it this face engages with an operating rod 31 of a detecting switch 30, it can push the rod so as to turn on the switch 30 as will be described later. On the other hand, the level of the face $b$ is set such as to bring the operating rod 31 to a position to turn off the switch 30.

The detecting switch 30 serves to detect a certain extent of taking up or paying off the seat belt webbing 12.

It is secured to the outer side the side wall 2 of the retractor body 1 such that the solenoid unit 27 is energized when the free end 32 of its operating rod 31 is brought into engagement with the face $c$ or $d$ of the cam section 21A or 21C of the cam plate 21 and that the solenoid unit 27 is de-energized when the operating rod 31 becomes engaged with the face $b$ of the cam section 21B.

Numerals 33 and 34 designate covers, and numeral 35 designates a bolt hole for fixing the retractor body 1 in a predetermined position in vehicle seat.

Figure 3:
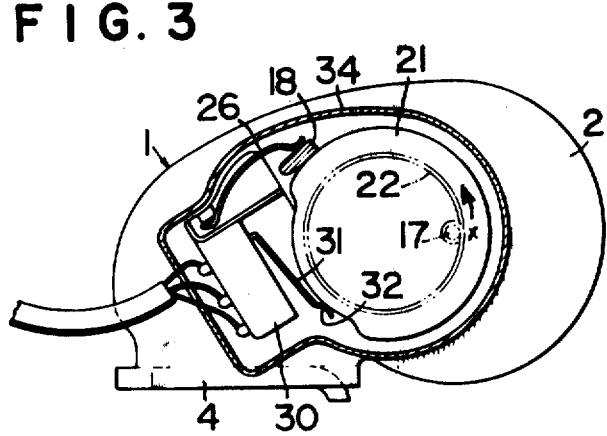
FIG. 3 is a sectional view taken along line III—III in FIG. 1.
Figure 4:
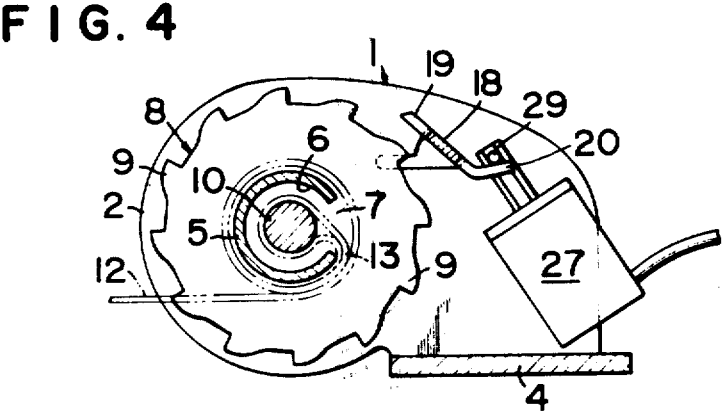
FIG. 4 is a sectional view taken along line IV—IV in FIG. 1.
Figure 5:
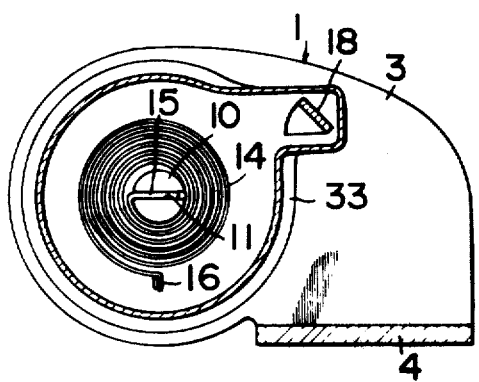
FIG. 5 is a sectional view taken along line V—V in FIG. 1.

The pawl 18, cam plate 21 and detecting switch 30 are assembled such that they are in a positional relation as shown in FIG. 3 when the seat belt webbing 12 is completely taken up.

In the operation of the cam plate 21, for an initial period of paying off the seat belt webbing 12 the pawl is in engagement with the face $a$ of the cam section 21A of the cam plate 21, so that the pawl 18 is held raised to a position not subject to engagement with the ratchets 8. Also, for this period the oprating rod 31 of the detecting switch 30 is in engagement with the face $b$ of the cam section 21B, so that the detecting switch 30 is "off" to hold the solenoid unit 27 in the non-energized state. Thus, the section of the seat belt webbing 12 corresponding to this period can be freely paid off or taken up.

As the seat belt webbing 12 is being paid off, the cam plate 21 is rotated in the direction of arrow (X) in FIG. 3. When the face $f$ of the cam section 21C comes to a position for engagement with the pawl 18, the engagement projections 19 of the pawl 18 are ready brought into engagement with the clicks 9 of the ratchets 8 by the action of the plate spring 16. At this time, however, the operating rod 31 of the detecting switch 30 rises on the face $c$ of the cam section 21A. In this state, the detecting switch 30 is "on," energizing the solenoid unit 27, so that thhe pin 29 of the plunger 28 acts to urge the legs 20 of the pawl 18 for holding the engagement projections 19 thereof to the non-engagement position. Thus, the seat belt webbing 12 continues to be freely paid off or taken up.

With further rotation of the cam plate 21 the cam section 21C comes to a position for engagement with the pawl 18. At this time, the same situation as that when the cam section 21C comes to the position for engagement with the pawl 18 is brought about, with the operating rod of 31 of the detecting switch 30 riding on the cam face $d$ of the cam section 21C to hold the detecting switch 30 "on". Thus, the seat belt webbing 12 still continues to be freely paid off or taken up.

The occupant is normally restrained when the cam plate 21 is at a position, at which the pawl 18 rides on the cam face $c$ and the operating rod 31 of the detecting switch 30 is in engagement with the cam face $b$ of the cam section 21B. In this position, the seat belt webbing retractor can be positively locked by the engagement of the engagement projections 19 of the pawl 18 with the clicks of the ratchets 8 brought about by de-energizing the solenoid unit 27 to remove the force exerted to the pawl 18 by the plunger 28. The action of de-energizing the solenoid unit 27 can be achieved by providing the circuit for operating the solenoid unit 27 with a de-energizing circuit actuated when a collision sensor means senses a collision.

Figure 10:
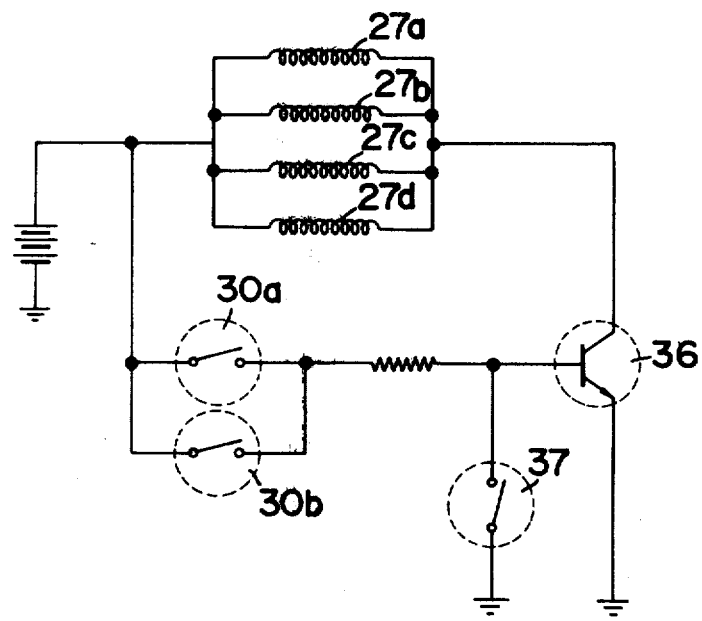
FIG. 10 is a circuit diagram of an electric circuit used with the retractor.

FIG. 10 shows an electric circuit for achieving this section. When the seat belt webbing 12 is completely taken up within the retractor body 1 and during the initial period of paying it off, the retractor is released mechanically. When the seat belt webbing 12 is paid off beyond a predetermined length to set in the occupant restrainment period, a detecting swithc 30a at a driver's seat and a detecting switch 30b at an assistant's seat are closed to turn on a transistor 35, thus causing the energization of solenoids 27a and 27b at the driver's seat and solenoids 27c and 27d at the assistant's seat. In this state, the retractor is released both mechanically and electrically with the seat belt fitted on the occupant.

At this time, if the conventional collision sensor means 37 is actuated immediately before a collision between vehicles or a collision of the vehicle with another object, the base of the transistor 36 is grounded to cut off the transistor 36 so as to de-energize the solenoids 27a to 27d, bringing the pawl 18 into engagement with the clocks 9 of the ratchets 8, thus locking the seat belt webbing 12.

What is claimed is:

1. A seat belt webbing retractor comprising:
   a retractor body having opposite side walls and a bottom;
   a take-up shaft having means to take up a seat belt webbing, said take-up shaft being rotatably mounted between said opposite side walls of said retractor body;
   a pair of ratchets respectively secured to the opposite ends of said take-up shaft;
   a pawl disposed within said retractor body;
   means for urging said pawl to engage with said ratchets for preventing the rotation of said take-up shaft in the direction of paying off the seat belt webbing;
   a solenoid unit supported on said retractor body, said solenoid unit being adapted to hold during the energization thereof said pawl at a position not subject to engagement with said ratchets;
   a switch means for rendering said solenoid unit de-energized;
   a cam plate including a cam section adapted to engage said pawl so as to hold said pawl at the position not subject to engagement with said ratchets only during an initial period fo paying off the seat belt webbing and another cam section adapted to act upon said switch means for rendering said solenoid unit de-energized only during said initial period;
   a de-energized circuit having a collision sensor means operative to de-energize said solenoid unit upon being actuated; and
   gears coupling said cam plate to said take-up shaft, to enable said cam plate to execute substantially one rotation for a total number of rotations of said take-up shaft required for paying off the total length of the seat belt webbing.

2. The seat belt webbing retractor as defined in claim 1, wherein said take-up shaft comprises a hollow shaft having a cylindrical space and formed with an axial slot extending over the entire length and a main shaft extending within and said hollow shaft and made integral with said hollow shaft.

3. The seat belt webbing retractor as defined in claim 2, wherein said main shaft has a small gear secured thereto at one end thereof and having an involute gear form.

4. The seat belt webbing retractor as defined in claim 1, wherein said take-up means consists of a groove formed in one end of said take-up shaft and a spiral spring, said spiral spring having an inner end anchored in said groove and an outer end secured to one of said side walls of said retractor body.

5. The seat belt webbing retractor as defined in claim 1, wherein said pawl has engagement projections capable of engagement with said ratchets.

6. A seat belt webbing retractor as defined in claim 1, wherein said means for urging said pawl is a plate spring normally biasing said pawl in engagement with said ratchets.

7. The seat belt webbing retractor as defined in claim 3, wherein said cam plate has an internal gear meshing with said small gear.

8. The seat belt webbing retractor as defined in claim 1, wherein said pawl has two L-shaped legs, said legs being coupled by a pin to a plunger of said solenoid unit.

9. The seat belt webbing retractor as defined in claim 1, wherein said cam plate has a first peripheral cam section with a length corresponding to said initial period of paying off the seat belt webbing, a second peripheral cam section with a length corresponding to a final period of paying off the seat belt webbing and a third peripheral cam section with a length corresponding to an occupant restrainment period, the peripheral length of said second cam section being smaller than that of said first cam section, the peripheral length of said third cam section being greater than that of said first cam section.

10. The seat belt webbing retractor as defined in claim 9, wherein:
    said first peripheral cam section has a radially raised cam face for engagement with said pawl and a radially raised cam face for engagement with the operating rod of the detecting switch;
    said second peripheral cam section has a non-raised cam face for engagement with said pawl and a non-raised cam face free from engagement with the operating rod of the detecting switch; and
    said third peripheral cam section has a non-raised cam face for engagement said pawl and a radially raised cam face for engagement with the operating rod of the detecting switch.

11. The seat belt webbing retractor as defined in claim 10, wherein:
    the level of the cam face of said first peripheral cam section for engagement with said pawl is such that the engagement projections of the pawl is raised to a position not subject to engagement with said ratchets when the projections are brought to engagement with that cam face;
    the level of the cam faces of said second and third peripheral cam sections for engagement with said pawl is such that the engagement projections of the pawl is lowered to a position subject to engagement with said ratchets when the projections are brought to engagement with those cam faces;
    the level of the cam faces of said first and third peripheral cam sections for engagement with operating rod of the detecting switch is such that the detecting switch is turned on when the operating rod thereof is brought to engagement with those cam faces; and
    the level of the cam face of said second peripheral cam section free from engagement with the operating rod of the detecting switch is such as to be able to turn off the detecting switch.

12. The seat belt webbing retractor as defined in claim 11, wherein:

the cam face of said third peripheral cam section is at the same level as the cam faces of said second peripheral cam section for engagement with said pawl and for non-engagement with the operating rod of the detecting switch; and the cam face of said third peripheral cam section is at the same level as the cam faces of said first peripheral cam section for engagement with said pawl and for engagement with the operating rod of the detecting switch.

13. The seat belt webbing retractor as defined in claim 1, wherein said solenoid unit has a solenoid connected in parallel with a power source and the collector-emitter path of a transistor, said solenoid being connected to said power source through the afore-said switching means, the afore-said collision sensor means being connected between the base and emitter of said transistor.

14. The seat belt webbing retractor as defined in claim 1, wherein said cam plate is made of a plastic material.

* * * * *